United States Patent
Ando et al.

(10) Patent No.: US 8,674,899 B2
(45) Date of Patent: Mar. 18, 2014

(54) RADOME INCORPORATING PARTITION WALL FOR ENHANCING ISOLATION BETWEEN TRANSMITTED AND RECEIVED RADAR WAVES OF RADAR APPARATUS

(75) Inventors: Takamasa Ando, Gifu (JP); Kazuma Natsume, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/200,228

(22) Filed: Sep. 21, 2011

(65) Prior Publication Data
US 2012/0105300 A1   May 3, 2012

(30) Foreign Application Priority Data

Oct. 28, 2010   (JP) .................................. 2010-242449

(51) Int. Cl.
*H01Q 1/42* (2006.01)
(52) U.S. Cl.
USPC .......................................... 343/872; 343/702
(58) Field of Classification Search
USPC .......................................... 343/700, 872, 702
See application file for complete search history.

(56) References Cited

U.S. PATENT DOCUMENTS

| | | | | |
|---|---|---|---|---|
| 4,653,118 A | * | 3/1987 | de Jong | 455/286 |
| 4,924,237 A | * | 5/1990 | Honda et al. | 343/702 |
| 5,583,521 A | * | 12/1996 | Williams | 343/702 |
| 6,154,179 A | * | 11/2000 | Kohno | 343/719 |
| 6,178,318 B1 | * | 1/2001 | Holmberg et al. | 455/300 |
| 6,614,405 B1 | * | 9/2003 | Mikkonen et al. | 343/872 |
| 6,646,611 B2 | * | 11/2003 | Plet et al. | 343/702 |

FOREIGN PATENT DOCUMENTS

| | | |
|---|---|---|
| JP | 63-95305 | 6/1988 |
| JP | 01-233381 | 9/1989 |
| JP | 10-126146 | 5/1998 |
| JP | 10-276019 | 10/1998 |
| JP | 2004-163116 | 6/2004 |
| JP | 2005-249659 | 9/2005 |
| JP | 2009-284287 | 12/2009 |
| JP | 2010-210297 | 9/2010 |

OTHER PUBLICATIONS

Notification of Reasons for Rejection issued Sep. 11, 2012 in corresponding Japanese Application No. 2010-242449 with English partial translation.
Office Action dated Jul. 2, 2013 in corresponding Chinese Application No. 201110332570.7.
Office Action dated Aug. 27, 2013 in corresponding Japanese Application No. 2010-242449.

* cited by examiner

*Primary Examiner* — Tho G Phan
(74) *Attorney, Agent, or Firm* — Harness, Dickey & Pierce, PLC

(57) ABSTRACT

A radome covers an antenna substrate of a millimeter-band radar apparatus, with a partition wall formed integrally in the radome separating the internal space of the radome into a first internal space, located in correspondence with a transmitting antenna section, and a second internal space, located in correspondence with a receiving antenna section. Increased isolation between transmission and reception is achieved thereby, by reducing the amount of transmitted radar waves which directly reach the receiving antenna section.

3 Claims, 3 Drawing Sheets

RADOME INCORPORATING PARTITION WALL FOR ENHANCING ISOLATION BETWEEN TRANSMITTED AND RECEIVED RADAR WAVES OF RADAR APPARATUS

CROSS-REFERENCE TO RELATED APPLICATIONS

This application is based on and incorporates herein by reference Japanese Patent Application No. 2010-242449 filed on 28 Oct. 2010.

BACKGROUND OF THE INVENTION

1. Field of Application

The present invention relates to a radome incorporating a partition wall for providing enhanced isolation between transmitted and received radar waves, and to a radar apparatus incorporating the radome.

2. Description of Related Art

Types of radar apparatus are known, in particular for installation in a vehicle for detecting target objects ahead of the vehicle, which transmit/receive radar waves in the millimeter-wavelength range. Such a radar apparatus typically employs a planar antenna structure, in which a transmission section is formed of a pattern of conductive material formed on a planar face of substrate and a receiving section is similarly formed of a pattern formed on a substrate. An example of this is illustrated in the cross-sectional view of FIG. 4A, in which the antenna has a transmitting antenna section 151 and a receiving antenna section 153 which are both formed on the same face of a antenna substrate 150, for compactness. That face is referred to in the following as the antenna formation face. However with such a configuration it is difficult to achieve a sufficient degree of isolation between transmitted and received waves. That is to say, it is difficult to sufficiently reduce the strength of transmitted radar waves from the transmitting antenna section 151 which are directly received by the receiving antenna section 153 (i.e., which "leak" to the receiving antenna section 153 from the transmitting antenna section 151), instead of being received only after reflection from a target object.

Such directly received radar waves are indicated by the arrow lines in FIG. 4A, and produce increased reception noise. This causes the noise floor of the received signal to be raised, thereby lowering the detection performance (e.g., reducing the maximum range at which target objects can be detected).

Furthermore as illustrated in the cross-sectional view of FIG. 4B, when a radome 130 is provided, formed of a material which is transparent to radar waves and which covers the transmitting antenna section 151 and receiving antenna section 153, some transmitted waves are reflected from the internal face of the front wall 130 towards the receiving antenna section 153. These reflected waves act to further reduce the isolation between transmitted and received waves.

For that reason it has been proposed (e.g., in Japanese patent application publication No. 10-126146) as illustrated in FIG. 5, to increase the isolation between transmitted and received waves by installing a partition wall 160, formed of a metal plate, or a plate of a material which absorbs radar waves. This is mounted on the antenna formation face of the antenna substrate 150, between the transmitting antenna section 151 and the receiving antenna section 153. However with such a method, it is necessary to provide and install a partition wall 160 which is formed of a different material from that of the antenna substrate 150. This raises the problem of increasing the number of component parts required for manufacturing the radar apparatus, and additional manufacturing operations for attaching the partition wall 160 to the antenna substrate 150. Thus there is the disadvantage that the overall manufacturing cost of the radar apparatus becomes increased, due to incorporating the partition wall.

SUMMARY OF THE INVENTION

It is an objective of the present invention to overcome the above problem, by providing a radome formed of a material transparent to radar waves, for covering the antenna formation face of an antenna substrate of a millimeter-wave radar apparatus, whereby the isolation between transmitted and received waves can be enhanced without requiring additional component parts, and without requiring an increased number of manufacturing operations when assembling the radar apparatus.

To achieve the above objectives, the invention provides a radar apparatus comprising an antenna substrate having a transmitting antenna section for transmitting radar waves and a receiving antenna section for receiving radar waves, with each of these antenna sections formed in common on an antenna formation face of the antenna substrate. A radome formed of a material transparent to radar waves covers the antenna formation face. The invention is characterized in that the radome includes an integrally formed partition wall. The partition wall is configured such that when the radome is installed on the radar apparatus with an internal space formed between the radome and the antenna substrate, that internal space becomes divided into two internal spaces. One of these is positioned in correspondence with the transmitting antenna section while the other internal space is positioned in correspondence with the receiving antenna section.

With such a form of radome incorporated in a radar apparatus, a significantly increased degree of isolation can be achieved between transmitted radar waves and received radar waves. It has been found that this effect is obtained, in spite of the fact that the partition wall is formed integrally with the other parts of the radome, i.e., is formed of a material which is transparent to the radar waves. This is largely due to the fact that a substantial proportion of the transmitted waves which would otherwise "leak" to the receiving antenna become reflected by the partition wall. The greater the angle of incidence of these transmitted waves upon the partition wall, the greater becomes the extent to which the incident waves are reflected.

When the radome is installed on the main body of the radar apparatus, the partition wall is thereby also installed. The invention thus enables the objective to be achieved without requiring additional component parts or additional manufacturing operations (by comparison with the case in which no partition wall is utilized). Hence, enhanced isolation between transmission and reception of the radar waves is obtained without increase in manufacturing costs.

DESCRIPTION OF PREFERRED EMBODIMENTS

Figure 1:
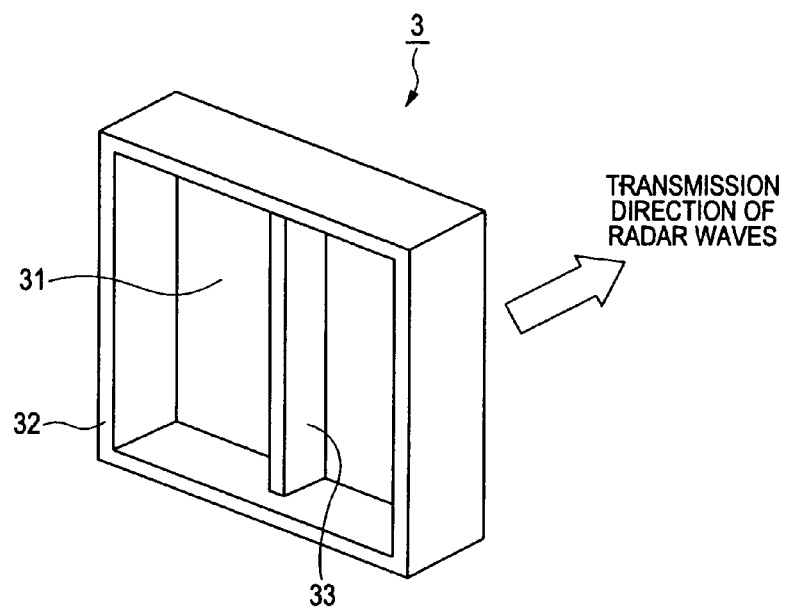
FIG. 1 is an oblique external view showing the general form of an embodiment of a radome.
Figure 2:
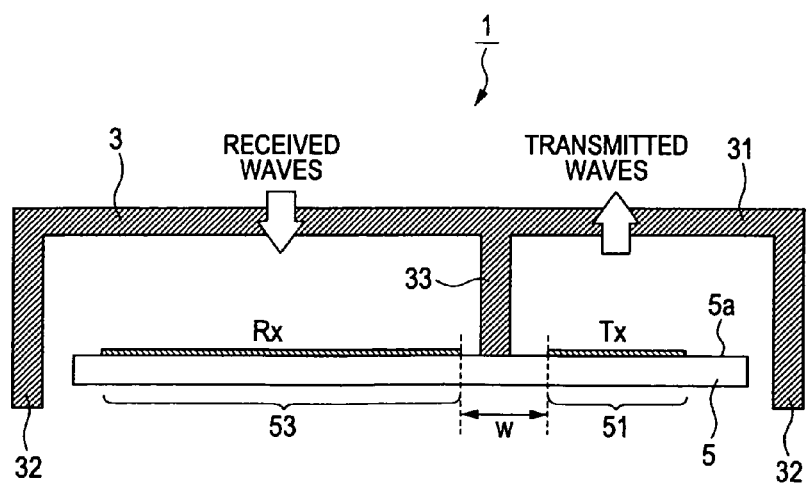
FIG. 2 is a cross-sectional view illustrating the radome of FIG. 1 installed in a condition of covering an antenna substrate of a radar apparatus.

FIG. 1 is an oblique view showing the configuration of an embodiment of a radome, designated by numeral 3, while FIG. 2 is a cross-sectional view showing the radome 3 disposed covering an antenna substrate 5 of a radar apparatus 1, when installed in a radar apparatus 1. The antenna substrate 5 is part of a main body of the radar apparatus 1.

The radar apparatus 1 is designed for installation in a vehicle, for transmitting/receiving radar waves in the millimeter wavelength range (with this embodiment, 76.5 GHz radar waves). The radar apparatus 1 obtains information (range, velocity, position, bearing, etc.,) concerning target objects such as preceding vehicles, obstacles in the road, roadside objects, etc., based on received radar waves that are reflected from such target objects.

As shown in FIG. 1, the radome 3 is basically in the form of a rectangular box which is open on one side. In the following, the part of the radome 3 which forms the base of the internal space formed within the radome 3 will be designated as the front wall 31, while the peripheral portion which separates the internal space from the exterior is designated as the aperture rim 32, the face of the front wall 31 from which the aperture rim 32 extends is designated as the rear face, while the opposite (external) face of the front wall 31 is designated as the front face. Thus the direction from the rear face toward the front face is the transmission direction of the radar waves.

A partition wall 33, which is formed integrally with the other parts of the radome 3, extends from the rear face of the front wall 31, dividing the internal space between the radome 3 and the antenna substrate 5 into two rectangular internal spaces. The radome 3 is formed of a material which is transparent to radar waves in the millimeter wavelength range, such as polyphenylene sulphide (PPS), polybutylene terephthalate (PBT), syndiotactic polystyrene (SPS), etc. The thickness of each of the parts of the radome 3, including that of the partition wall 33, is approximately one half-wavelength of the radar waves that are utilized (i.e., approximately 2 mm).

As illustrated in FIG. 2, the antenna substrate 5 includes a transmitting antenna section 51 which is formed with a planar pattern of conducting material, utilized as a transmitting antenna, and a receiving antenna section 53 which is formed with a planar pattern of conducting material, utilized as a receiving antenna. A gap W, which is larger than the thickness of the partition wall 33, separates the respective patterns of the transmitting antenna section 51 and the receiving antenna section 53. The face of the antenna substrate 5 on which the patterns of the transmitting antenna section 51 and receiving antenna section 53 are formed is designated as the pattern formation face 5a.

The radome 3 is installed such as to cover the antenna substrate 5, with the partition wall 33 in contact with the pattern formation face 5a of the antenna substrate 5, positioned between the respective patterns of the transmitting antenna section 51 and the receiving antenna section 53, without contacting either of these patterns. As can be understood from in FIG. 2, the aforementioned two rectangular internal spaces are respectively located in correspondence with the transmitting antenna section 51 and the receiving antenna section 53.

When the radar apparatus 1 is assembled with the radome 3 in the position relationship shown in FIG. 2, radar waves which are transmitted from the transmitting antenna section 51 pass out through the front face of the front wall 31 of the radome 3, and reflected radar waves from a target object pass in through that front face, to be received by the receiving antenna section 53. Part of the transmitted radar waves pass through the partition wall 33 and "leak" back to be received by the receiving antenna section 53. However a significant part of those radar waves which reach the partition wall 33 are then reflected, and so do not directly reach the receiving antenna section 53. The greater the angle of incidence of these radar waves on the partition wall 33, the greater is the extent to which they are reflected. The partition wall 33 thereby serves to reduce the strength of transmitted radar waves from the transmitting antenna section 51 which are directly received by the receiving antenna section 53.

Hence the partition wall 33 provides enhanced isolation between transmitted and received waves of the radar apparatus 1, while being formed as an integral part of the radome 3. Thus, by comparison with the case in which the partition wall 33 is not provided, it is not necessary to provide any additional component parts, or to perform any additional assembly operations, for providing the partition wall 33.

The partition wall 33 is preferably positioned as close as possible to each of the transmitting antenna section 51 and receiving antenna section 53, without actually contacting either of these patterns. The closer the partition wall 33 is to each of these patterns, the greater will be the extent to which isolation between transmitted and received radar waves is enhanced.

Other Embodiments

The invention is not limited to the above embodiment, and various modifications or alternative forms of the embodiment may be envisaged, which fall within the scope claimed for the invention in the appended claims.

Figure 3:
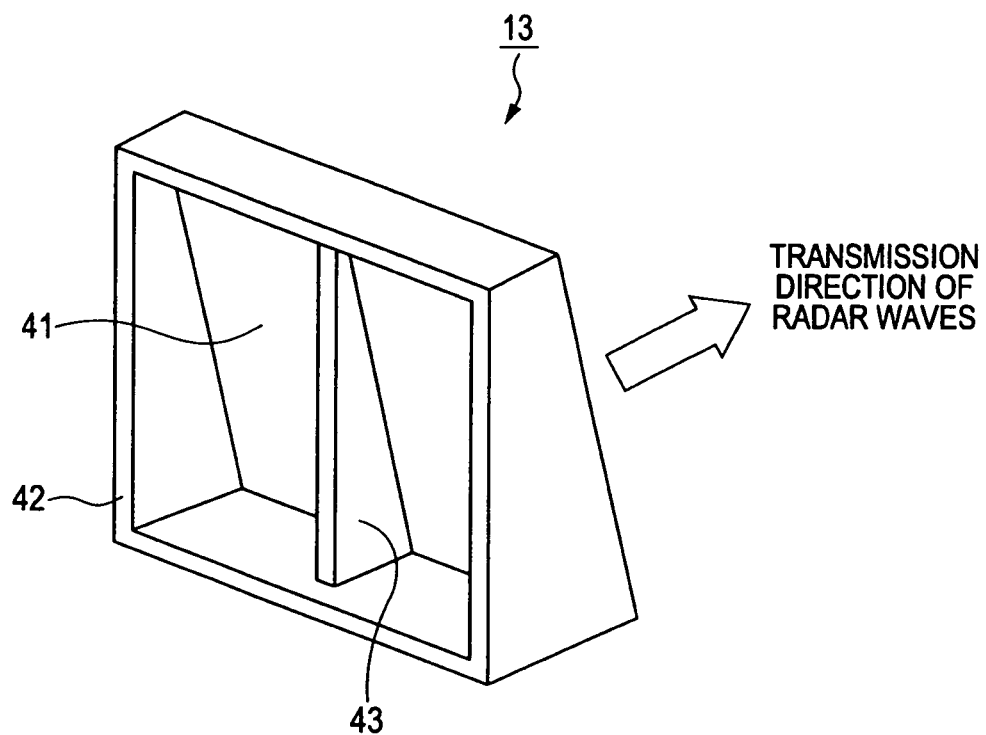
FIG. 3 is an oblique external view showing the general form of an alternative embodiment of a radome.
Figure 4A:
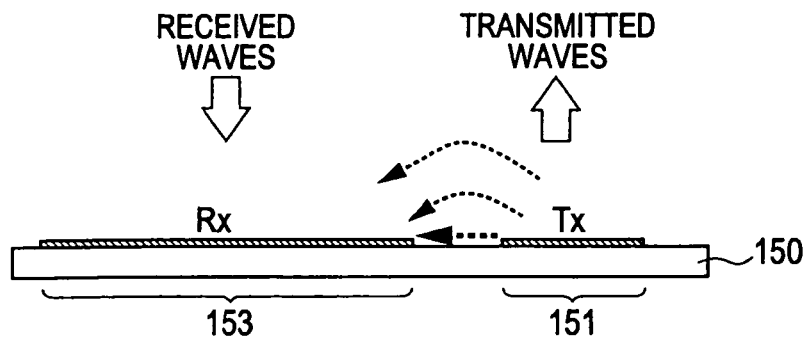
FIGS. 4A and 4B are cross-sectional views for describing a problem of the prior art.
Figure 4B:
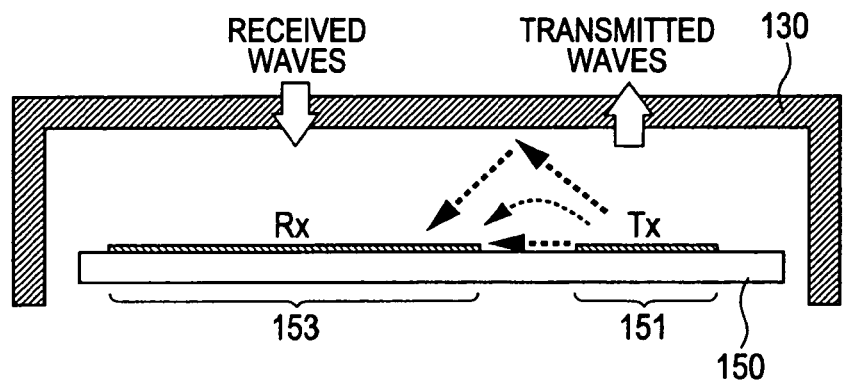
Figure 5:
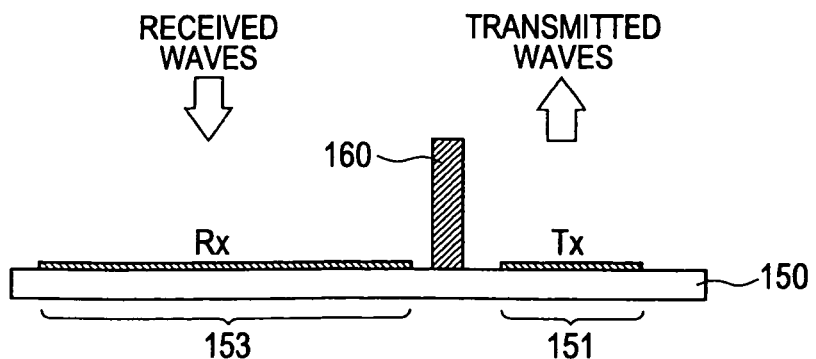
FIG. 5 is a cross-sectional view illustrating a prior art example of an antenna substrate of a radar apparatus, having a partition wall attached thereon.

For example with the above embodiment the radome 3 is configured such that, when installed on the radar apparatus 1, the front wall 31 is oriented parallel to the pattern formation face 5a of the antenna substrate 5. However it would be equally possible to employ the configuration shown in FIG. 3. In this case, similar to the front wall 31 of the first embodiment, the front wall 41 of the radome 13 is of flat shape. However with the embodiment of FIG. 3 (when the radome 13 is installed to cover the antenna substrate 5) the front wall 31 is oriented at a specific angle with respect to the pattern formation face 5a. The angle is preferably made 2° or greater. The partition wall 43 of this embodiment is shaped and positioned such as to contact the pattern formation face 5a of the antenna substrate 5 in the same manner as described for the partition wall 33 of the first embodiment, dividing the internal space within the radome into an internal space corresponding to the transmission section 51 and an internal space corresponding to the receiving antenna 53.

With this alternative embodiment, the strength of transmitted radar waves which reach the receiving antenna section 53 after having been reflected from the rear face of the front wall 41 of the radome 13 is less than for the case of the first embodiment, i.e., the alternative embodiment provides improved isolation between transmitted and received radar waves. This is due to the slope of the front wall 41 with respect to the pattern formation face 5a of the antenna substrate 5.

With the above embodiments, the thickness of the partition wall 33 (43) of a radome is identical to the thickness of the other parts of the radome, i.e., approximately one half-wavelength of the radar waves. However the invention is not limited to this, and the thickness of the partition wall can for example be determined such as to minimize adverse effects of the partition wall upon the directionality characteristics of the radar apparatus.

Furthermore with the above embodiment, the transmitting antenna section 51 and the receiving antenna section 53 are respectively fixed in position. However the invention is also applicable to a type of radar apparatus in which the transmitting antenna section 51 and receiving antenna section 53 can be mechanically displaced (up and down, and/or to the left and right), for moving the transmitted/received beam pattern within a beam displacement range. In that case, the partition wall 33 may be positioned or shaped such as to avoid blocking (shielding) any part of the beam displacement range.

Hence it is to be understood that the invention is not limited to the embodiments described above, and that various modifications or alternative forms of these embodiments may be envisaged, which fall within the scope claimed for the invention as set out in the appended claims.

What is claimed is:

1. A radar apparatus comprising
    an antenna substrate having a transmitting antenna section for transmitting radar waves and a receiving antenna section for receiving radar waves, respectively formed in common on an antenna formation face of said antenna substrate, and
    a radome formed of a material transparent to radar waves, disposed to cover said antenna formation face of said antenna substrate;
    wherein said radome comprises an integrally formed partition wall, said partition wall having a configuration whereby an internal space between said radome and said antenna substrate is divided into a first internal space, located in correspondence with said transmitting antenna section, and a second internal space, located in correspondence with said receiving antenna section, the integrally formed partition wall being formed of said material transparent to the radar waves; wherein
    said radome is a single piece component.

2. A radome formed of a material transparent to radar waves, for covering an antenna formation face of an antenna substrate, said antenna substrate having a transmitting antenna section for transmitting radar waves and a receiving antenna section for receiving radar waves, respectively formed in common on said antenna formation face;
    wherein said radome comprises an integrally formed partition wall, said partition wall having a configuration whereby when said radome is positioned to cover said antenna formation face, an internal space between said radome and said antenna substrate is divided into a first internal space, located in correspondence with said transmitting antenna section, and a second internal space, located in correspondence with said receiving antenna section, the integrally formed partition wall being formed of said material transparent to the radar waves; wherein
    said radome is a single piece component.

3. A radome formed of a material transparent to radar waves, for covering an antenna formation face of an antenna substrate, said antenna substrate having a transmitting antenna section for transmitting radar waves and a receiving antenna section for receiving radar waves, respectively formed in common on said antenna formation face;
    wherein said radome comprises an integrally formed partition wall, said partition wall having a configuration whereby when said radome is positioned to cover said antenna formation face, an internal space between said radome and said antenna substrate is divided into a first internal space, located in correspondence with said transmitting antenna section, and a second internal space, located in correspondence with said receiving antenna section,
    said radome comprises a front wall formed with a flat shape, said radome being configured to have said front wall oriented at an angle of at least 2° relative to said antenna formation face of said antenna substrate when said radome is positioned to cover said antenna formation face of said antenna substrate.

* * * * *